United States Patent

[11] 3,630,034

| [72] | Inventor | Carrol G. Whitlock<br>841 Grand Drive, Moses Lake, Wash. 98837 |
|---|---|---|
| [21] | Appl. No. | 13,393 |
| [22] | Filed | Feb. 24, 1970 |
| [45] | Patented | Dec. 28, 1971 |

[54] IRRIGATION CANAL TAPOFF SYSTEM
4 Claims, 5 Drawing Figs.

[52] U.S. Cl. .................................................. 61/12, 251/145
[51] Int. Cl. ....................................................... E02b 13/00
[50] Field of Search ............................................. 61/12, 14; 251/145

[56] References Cited
UNITED STATES PATENTS

| 499,524 | 6/1893 | Dockery ........................ | 61/12 |
| 1,789,500 | 1/1931 | Schmidt ........................ | 251/145 |
| 2,362,747 | 11/1944 | Duke ............................ | 61/12 |
| 2,979,082 | 4/1961 | Neves ........................... | 61/12 X |
| 3,439,505 | 4/1969 | Martin .......................... | 61/12 |

*Primary Examiner*—David J. Williamowsky
*Assistant Examiner*—David H. Corbin
*Attorney*—Wells, St. John & Roberts ABSTRACT: For tapping off water for a multiplicity of lateral rills from an irrigation canal, a weir is established in a basin in the canal whereby water can be drawn off and discharged downwardly in the desired quantity. The water is fed from the weir outlet into an elongated main conduit which is fitted at short intervals with metering caps operable to deliver measured flow of water to conduits individual to the lateral rills at a constant rate. The gravity head of the water flowing to the lateral rills is governed by the fact that the total amount of water fed into the main conduit from the weir is sufficient to keep it full at all times. With this system the individual conduits for the rills are buried in the ground and have their outlet ends entering the bottom of individual wells or cups at the heads of the rills, thus inserting actual delivery of the desired amount of water into each rill. The metering caps assure substantially exact supply to the individual lateral rills. The main conduit preferably is sectional and the sections are successively smaller as they are further away from the weir.

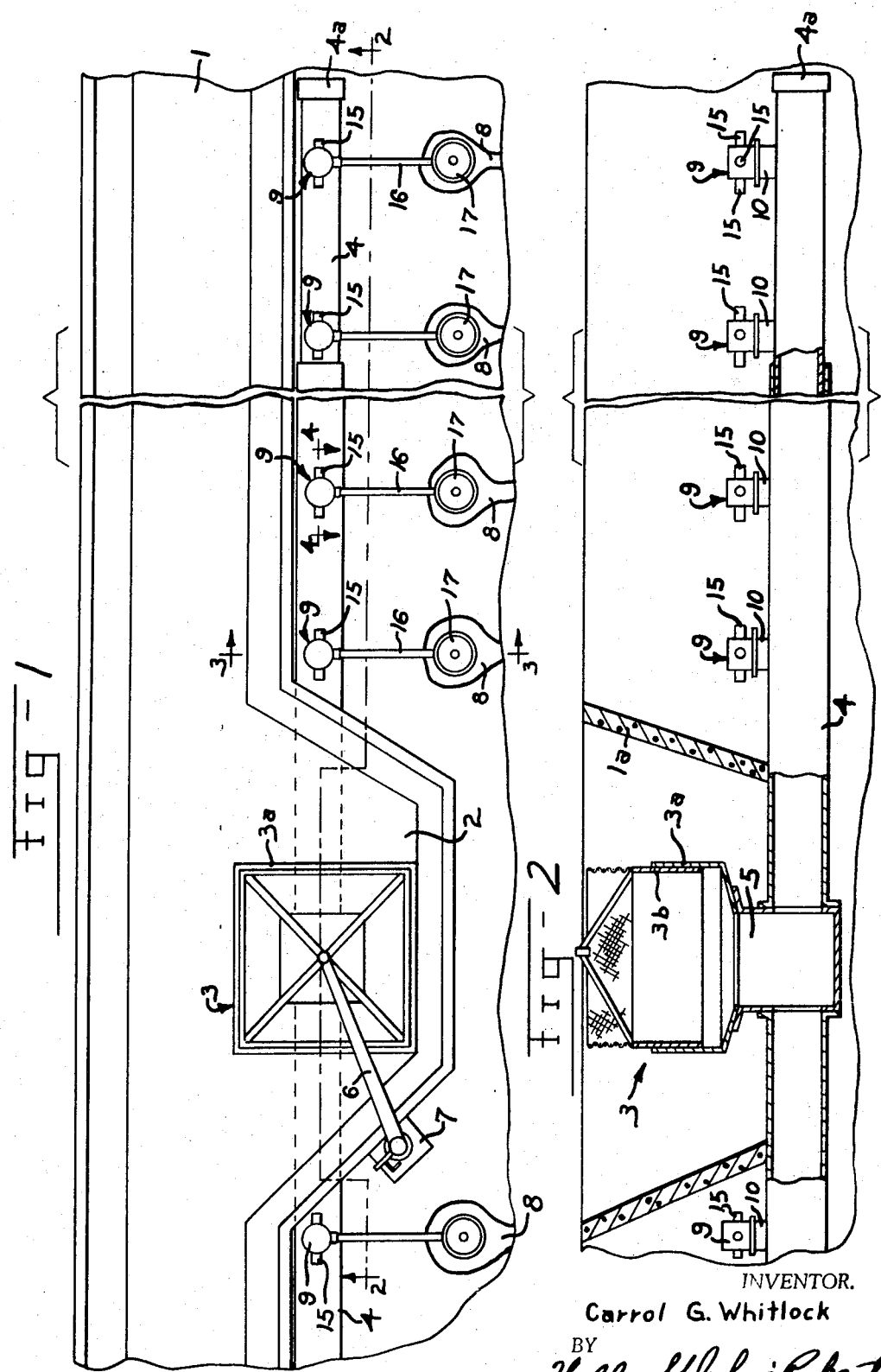

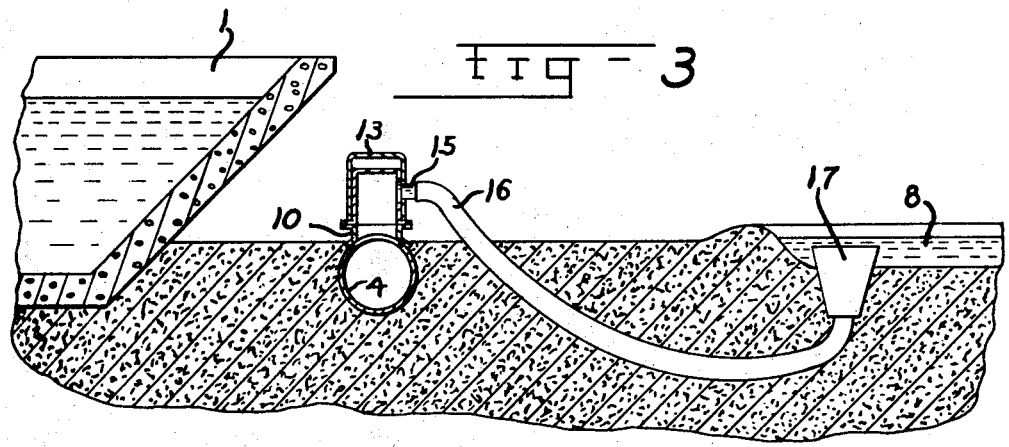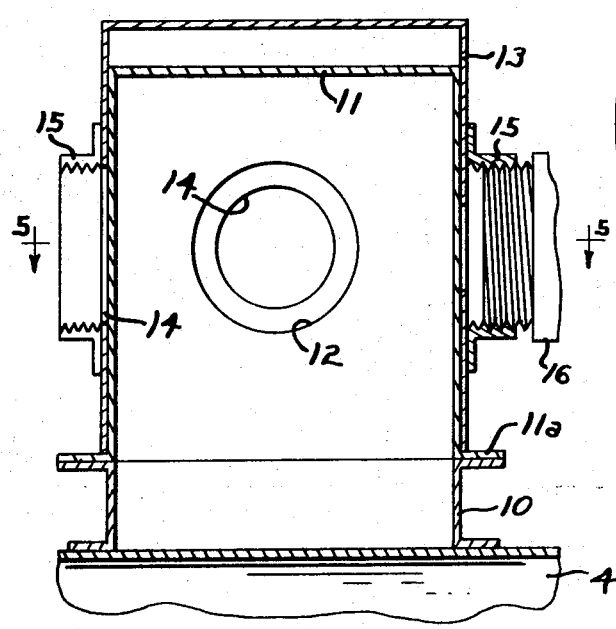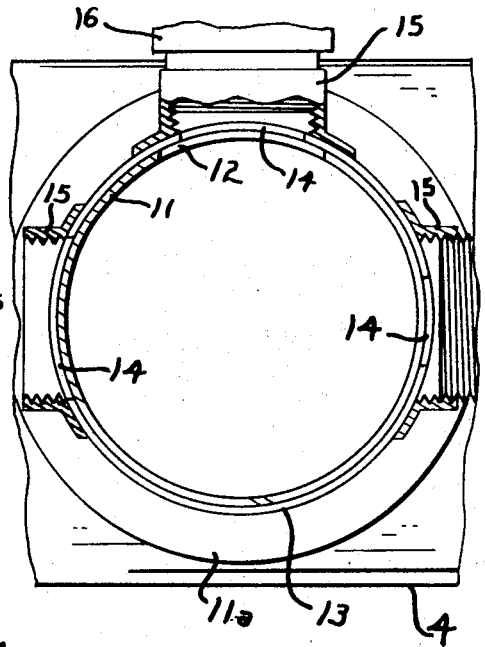

IRRIGATION CANAL TAPOFF SYSTEM

BACKGROUND OF THE INVENTION

The matter of distribution of water from a canal into a series of lateral rills has been the subject of much development for many years. However, for feeding water into the rills it is presently the general custom to use an individual siphon tube for each rill where one end of the tube is in the canal and the other end is in the rill. To control such a system it is necessary to close or remove each siphon tube when you want to stop the flow. Other methods have been developed for time control of the flow of water for irrigation of areas. An example of this is shown in the old U.S. Pat. to McKee No. 1,018,251. Individual rills have been supplied with water under a low pressure head in the manner shown in the U.S. Pat. to Duke No. 2,362,747. The Neves U.S. Pat. No. 2,979,082 shows that a metering sleeve has been used to control the amount of water discharged at a particular outlet. Other means of regulating the flow in an individual conduit is shown in the Towne U.S. Pat. No. 572,842. Other U.S. Patents less pertinent to the present invention are Dockery U.S. Pat. No. 499,524, Mendenhall No. 806,901, Parker No. 1,320,907, Haise No. 3,320,750 and Linxweiler reissue No. 14,081.

PURPOSE OF THE INVENTION

It is the purpose of the present invention to provide an irrigation system having a weir in an irrigation canal operable to draw off water from the canal and deliver the water into an elongated main closed conduit below the weir level and outside the canal which conduit has spaced hollow closed top riser heads with apertures therein to which the water is supplied at a uniform low-pressure head, metering sleeves on the riser heads to meter the flow of water through said apertures, and distribution means connected to the metering sleeves for distributing the water to particular ground areas to be irrigated.

More specifically the purpose of the invention is to provide the combination just defined wherein the main conduit is made up of a plurality of telescoping sections by which it may be extended and retracted to fit the sizes of ground areas to be irrigated from it.

It is also the purpose of this invention to provide the combination just defined wherein the distribution means embodies individual conduits with open-topped cups at their outlet ends for seating in the heads of rills traversing the particular ground areas to be irrigated whereby to alleviate washouts at the rill heads.

GENERAL DESCRIPTION

A preferred form of the invention is disclosed in the accompanying drawings wherein:

FIG. 1 is a somewhat diagrammatic plan view of a portion of an irrigation canal with the weir, main conduit riser heads and distribution conduits of my invention shown therewith;

FIG. 2 is a vertical sectional view taken on the line 2—2 of FIG. 1;

FIG. 3 is a sectional view taken on the line 3—3 of FIG. 1;

FIG. 4 is an enlarged sectional view taken on line 4—4 of FIG. 1 showing the details of a metering sleeve and riser head; and FIG. 5 is a sectional view taken on the line 5—5 of FIG. 4.

A canal 1 is provided with a basin 2 in which a weir 3 is located. The weir 3 is adopted to tap off the desired flow of water from the canal 1. Any suitable weir construction may be used for this purpose that will deliver the desired amount of water to keep a main distributor conduit 4 filled and to maintain a gravity head of water in the conduit 4, which head is due to the difference in elevation between the conduit 4 and the water level in the canal at the top of the weir 3.

The weir 3 shown is of rectangular construction with an outlet 5 downward through the canal wall 1a, the conduit 4 being joined to this outlet 5 and open to receive water therefrom. The weir 3 includes a stationary outer member 3a and a vertically adjustable inner member 3b which is lowered and raised by a lift arm 6 and any suitable lifting device 7 such as a screw jack of known construction. The top of the member 3b may be screened to keep debris on the surface of the canal from entering and going to the outlet 5.

Distribution of water evenly to the rills indicated at 8 is accomplished by an arrangement that utilizes the gravity head of water established in the conduit 4 and metering caps 9 that are mounted on the several sections of the conduit 4. The conduit 4 is shown as being made in sections that telescope to provide for elongation and shortening by sliding one section within a larger one. The endmost sections of the conduit 4 are closed at their outer ends by removable closures 4a, one of which is shown in FIGS. 1 and 2.

The metering caps 9 are all essentially the same in construction so a description of one cap will suffice for all. Each cap embodies a base tube 10 on the conduit 4 opening into the conduit and a top 11 which is in the form of an inverted cup. The tube 10 and the top 11 are flanged where they meet and secured together so as to form a column into which water can rise from the conduit 4. The top 11 is provided with an outlet aperture 12 in its sidewall. A sleeve 13, which may have a closed top as indicated, is slidable and rotatable on the top 11 and rests on the flange 11a of the top 11. The sleeve 13 has a plurality of different sized apertures 14 therein which can be aligned more or less with the aperture 12 to allow passage of a desired amount of water through the aperture 12 and the aligned aperture 14. Preferably the sleeve 13 has a hose connection 15 around each of its apertures 14 so that a short length 16 of hose can be connected to the sleeve for directing water into a desired rill 8.

A major problem in rill irrigation occurs in getting the right amount of water delivery into each rill. This metering cap assembly just described provides, with the weir 3 and main conduit 4, an individually settable orifice and a reasonably constant head or pressure of water to feed each rill. If there is a problem of washout at the receiving end of the rills 8 the hose lengths 16 may have plastic cups 17 on their outlet ends so they may be buried in the soil at the inlet ends of the rills. The water from the hoses rises and flows over the top edges of the cups 17 so as to minimize any tendency of the stream of water to wash out the soil and develop a path to another rill.

In operation this installation may consist of a series of the basins 2 spaced along a canal. Each basin preferably is a part of the canal. Each basin has a weir 3 therein, each weir 3 being in communication with a conduit 4 that has the metering caps 9 thereon spaced to generally match the spacing of the rills 8 to irrigate a particular area of land. The metering caps are adjusted to deliver the desired proportion of the available water to each rill. When the water has been supplied to the rills for the desired time, it is stopped by the simple step of closing the weir member 3 shown in FIGS. 1 and 2 to keep water from entering the conduit 4. Then the water is available for the next basin 2 downstream in the canal and the area of land supplied from that basin 2 is supplied by opening the weir member 3 in that basin. In this way a schedule of timed watering of the land areas can be set and adhered to. It is not necessary to change anything but the weirs, except to readjust any sleeve 13 that is not properly set to supply the right amount of water to the rill it feeds.

What is claimed is:

1. A system for taking water from an irrigation canal and delivering it to irrigation rills alongside the canal having in combination:

a. a basin in the canal operable to establish a water pool;
   b. a hollow weir in said basin, said weir including a stationary member and a vertically adjustable member, said vertically adjustable member having an open top whereby adequate flow of water into the weir is attained at various levels of water in the pool;
   c. an elongated tubular main distributor conduit outside the canal and below the level of the pool and having an inlet opening at one end into the bottom of said hollow weir; the conduit being closed at its other end;

d. hollow riser heads mounted on said conduit and spaced apart endwise of said conduit, said heads having their lower ends open to the interior of the conduit so that the heads are filled with water to a common level;
e. outlet hose connectors on said heads;
f. individually adjustable orifices in said heads opening into said hose connectors; and
g. flexible lengths of hose secured on said connectors to deliver water to irrigation rills adjacent to said heads.

2. The invention defined in claim 1 together with power means to raise and lower the vertically adjustable member.

3. The invention defined in claim 1 wherein the tubular main distributor conduit is made up of telescoping conduit sections which get smaller in cross section from the section thereof where the water enters from the weir to the end of said conduit most remote from the weir.

4. The invention defined in claim 1 wherein said flexible hoses have open cups at their free ends which can be set in the rills.

* * * * *